Sept. 16, 1947.    B. W. McCULLEY    2,427,412
SAW FILER
Filed June 7, 1946    2 Sheets-Sheet 1
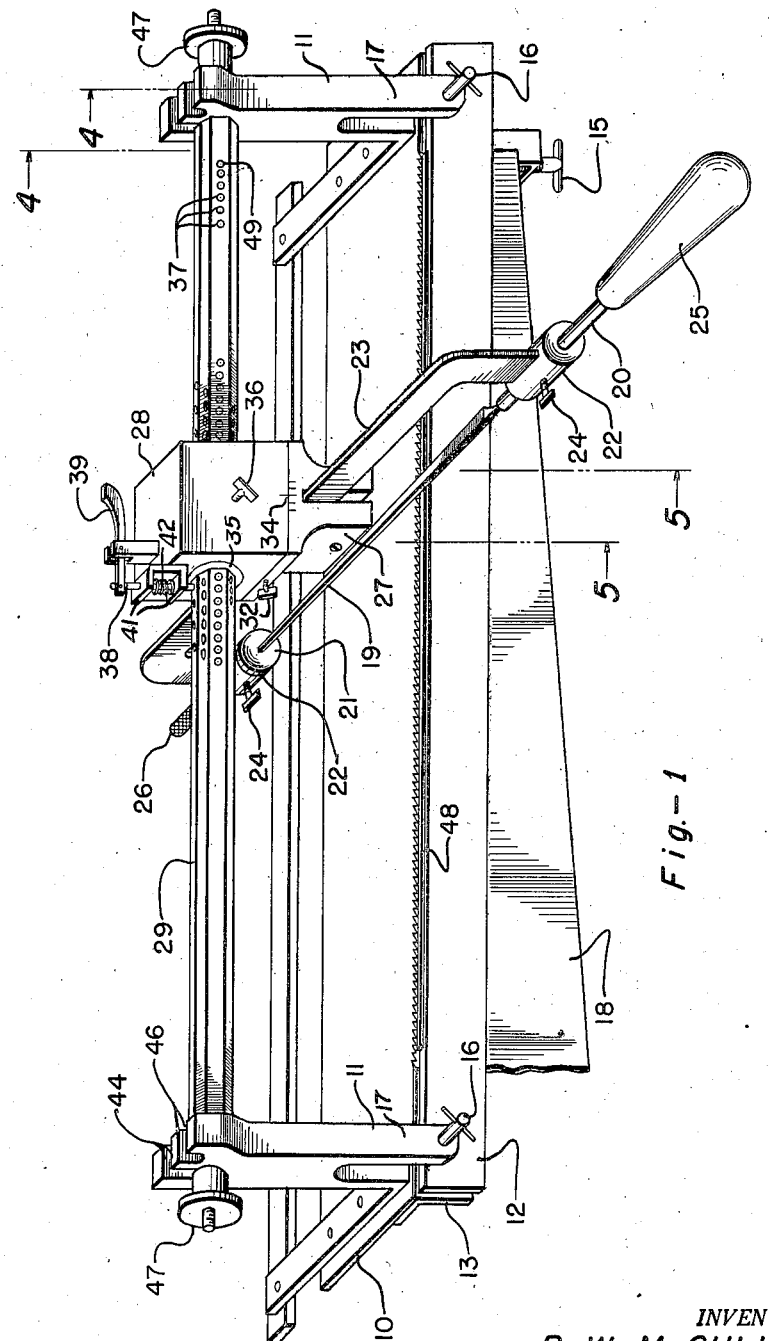
Fig.—1
INVENTOR.
B. W. McCULLEY
BY
Emery Holcombe & Blair
ATTORNEYS Sept. 16, 1947. B. W. McCULLEY 2,427,412
SAW FILER
Filed June 7, 1946 2 Sheets-Sheet 2
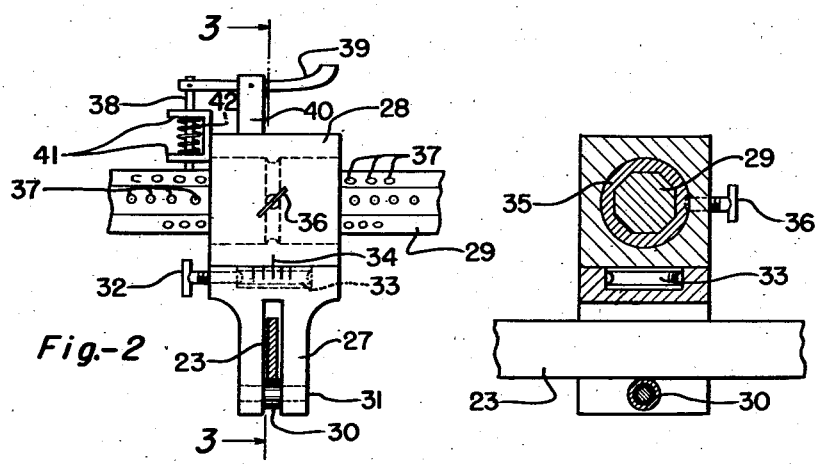
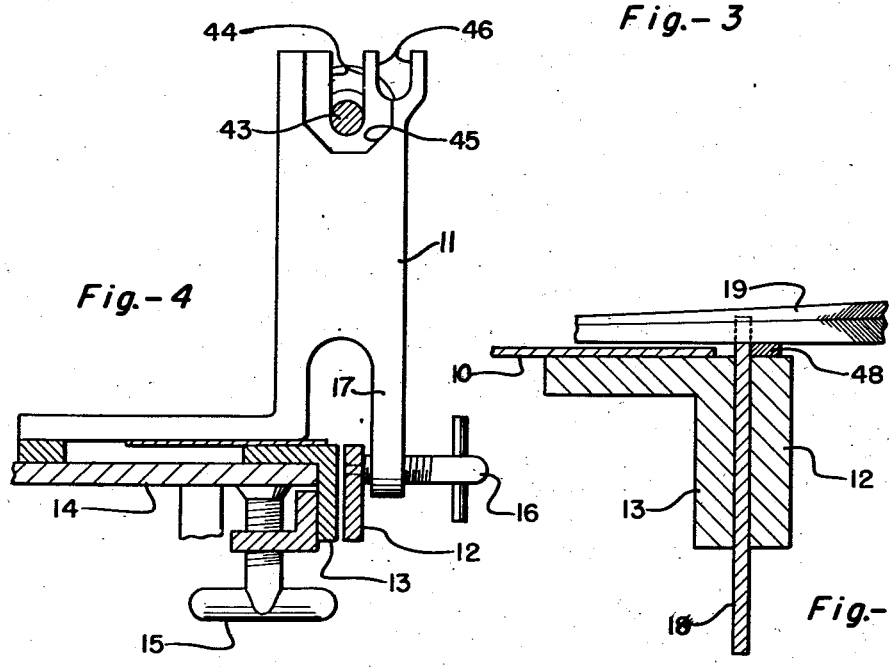
INVENTOR.
B. W. McCULLEY
BY
ATTORNEYS Patented Sept. 16, 1947

2,427,412

UNITED STATES PATENT OFFICE 2,427,412

SAW FILER

Burdette W. McCulley, Montrose, Colo.

Application June 7, 1946, Serial No. 674,983

5 Claims. (Cl. 76—33)

My invention relates to means for filing and retoothing saws, particularly hand saws although it is applicable to any saw having a straight cutting edge.

The invention aims to facilitate the sharpening of saws by hand filing, and to improve the uniformity of the work. Other objects and advantages of the invention appear in connection with the following description of the preferred embodiment illustrated in the accompanying drawings, wherein the same parts are designated by the same reference characters in the several views, and—

Fig. 1 is an isometric view of a saw filing apparatus as set up to file the teeth of a hand saw;

Fig. 2 is a front view of the guide yoke and portion of the spacing bar, showing the bow of the file holder in cross section, drawn to a larger scale than Fig. 1;

Fig. 3 is a cross section on the line 3—3 in Fig. 2, drawn to the same scale;

Fig. 4 is a cross section on the line 4—4 in Fig. 1, the saw being omitted, and drawn to the same scale as Figs. 2 and 3; and Fig. 5 is a cross section of the saw clamp and saw on the line 5—5 in Fig. 1, showing the relative positions of the file and saw and spacing block in operating position, the scale being larger than the other figures.

The device consists of a frame 10 including vertical inverted yoke shape brackets 11 at each end and front and back saw clamping bars 12, 13 adapted to be secured to the front edge of a work bench 14 by means of clamp screws 15, as shown in Figs. 1 and 4. The front saw clamping bar is supported by two clamp screws 16 which are rotatably secured thereto and which are in turn supported by the front legs 17 of the brackets 11, through which the screws are threaded, so that the saw 18 may readily be inserted from below and rigidly clamped in place with its teeth uppermost.

The file 19 is removably mounted in chucks 20, 21, which are slidable and rotatable in sockets 22 on the lower ends of the two arms of the bow 23, as shown in Fig. 1. These chucks are secured in adjusted position to hold the file at the desired angular position by means of thumb screws 24. A wood handle 25 is attached to the front chuck 20 and a knurled metal handle 26 is attached to the rear chuck 21 to enable the file to be grasped and operated by both hands, if desired.

The file bow 23 is suspended from a guide yoke 27 swiveled to turn on a vertical axis in the spacing block 28 slidably mounted on the octagonal spacing bar 29 which is secured at each end to the upper ends of the brackets 11. A roller 30 journalled on a screw pin 31 passing through the extremities of the legs of the guide yoke bears against the under side of the bow 23 and reduces the friction due to the forward and back reciprocations of the file at the bottom of each tooth cut as well as prevents the cut from being filed too deep.

The guide yoke 27 is secured in the desired angular position with respect to the spacing block 28 by means of a thumb screw 32. The inner end of this screw projects into a groove 33 on a circular boss on the under side of the block 28. Graduations 34 on the lower front edge of the guide block assist in positioning the guide yoke at the proper angle for the desired bevel of tooth to be filed.

The spacing block is provided with a cylindrical bushing 35 which has an octagonal transverse bore to receive the spacing bar 29, and a thumb screw 36, carried by the block and engaging the bushing, locks the latter and spacing bar against turning in the block when in use, the bar being drilled with series of spaced holes 37 on each of its eight faces corresponding to eight different spacings of saw teeth to suit different makes and types of saws. The sides or faces of the spacing bars are each numbered to correspond to the number of spacing holes per inch thereon in order to aid in setting up the apparatus for filing different makes and sizes of saws.

A latch pin 38 is pivoted on the end of a lever arm 39 mounted in a yoke 40 fixed on the top of the spacing block to work up and down in guides 41 on the side of the block and engage in one after another of the spaced holes in the upper face of the spacing bar as the filing of the saw teeth progresses. A spring 42 tends to hold the latch pin in engagement with the spacing bar holes.

The ends of the spacing bar are provided with cylindrical necks 43 which engage in corresponding journals in the forks 44 at the upper ends of the brackets 11, permitting the spacing bar to be rotated to bring the desired row of spacing holes uppermost. Part octagonal recesses 45 are formed in the inner faces of the brackets 11 to receive the hexagonal ends of the spacing bar when turned to the desired position. An additional pair of recesses 46 are provided in the upper ends of the brackets 11 for holding the spacing bar when the saw is being changed, although the saw may be changed by merely lifting the file. The ends of the neck portions of the spacing bar are threaded to receive clamping nuts 47 for securing it in operation position.

A depth gauge 48 is provided for setting the saw at the proper height in the saw clamps 12, 13. This gauge is merely a loose bar which is preferably removed after the saw has been clamped in place ready for filing.

The apparatus is preferably operated as follows:

First, the locking nuts 47 are loosened on both ends of the spacing bar 29 and the entire assembly of spacing bar, spacing block 28, swivelled guide yoke 27 and file bow 23, is lifted out of the forks 44 and rested in the recesses 46. The spacing block thumb screw 36 is loosened and the bar rotated to bring the desired row of holes 37 uppermost, whereupon the thumb screw is tightened and the entire assembly is replaced in the forks 44 with the ends of the spacing bar seated in the octagonal recesses and secured by tightening the nuts 47 on the ends of the spacing bar.

Next, the spacing block 28 is slid to the left as far as it will go and the lock pin 38 engaged in the first spacing hole 37, the swivel guide yoke 27 is set at the desired angle of cut and the screw 32 is tightened, and the proper file 19 for the work in hand is secured in the chucks 20, 21 by loosening the thumb screws 45 and separating the chucks far enough to place the point in the chuck 21 and the tang in the chuck 20 whereupon the latter is pushed back by means of the handle 25 to bring the chucks together to embrace the file and seat it firmly at both ends, after which both chucks and file are rotated to present its cutting face or edge at the proper cutting angle with respect to the saw teeth, and the thumb screws 24 are again tightened.

The saw is clamped in place by the clamps 13, first being set at the proper height by means of the gauge bar 48 to present the bottoms of the deepest cut teeth level with the top of the bar, taking care that the first tooth to be cut is aligned vertically with the file as the saw is raised into cutting position. After filing the first tooth to a depth such that the saw bow engages and rests upon the roller 30, the space block pin 38 is lifted and the block shifted one space to the right, moving the file into the next tooth space, and the filing is repeated as before. If the saw is longer than the spacing bar, when the last tooth corresponding to the spacing holes 37 has been filed, the block is shifted back to the left hand end of the bar, the saw is unclamped and shifted to the right until the first tooth cut is in vertical alignment with the file and clamped as before. The spacing and the filing are repeated.

This procedure continues until all the teeth on one side of the saw have been filed, whereupon the block 28 is shifted one half space to engage the space block pin in the end hole 49, and the saw is unclamped and turned end for end, the end tooth already filed being lined up vertically with the file, and the saw again clamped in place. Filing then is repeated from right to left, starting with the block shifted one half space to engage the spacing pin 38 in the last hole 37 to the right, and angle of setting of the guide yoke 27 being unchanged. This insures that the intervening teeth between those already filed will be filed to the same depth and to the same angle to the opposite hand as the teeth first filed. For some types of saws, the yoke is also turned with the saw to maintain the same angle or cut on the intervening teeth.

The invention enables inexperienced workmen to file saws successfully, and facilitates the rapid and accurate filing of saws by skilled workmen.

The invention is not restricted to the precise details of construction illustrated, but what I claim is as follows:

1. A saw filing device comprising a horizontal frame for clamping a saw with its blade in a vertical plane, said frame having supports at its ends in alignment with the saw blade, upwardly open seats in said supports, a spacing bar removably mounted in said seats for angular adjustment around its axis, said spacing bar being provided on its sides with rows of spaces respectively corresponding to the spaces between the teeth of saws to be filed, a spacing block slidable on said bar, means for holding said bar with the desired row of spaces in alignment with a face of said block, a locking member on said spacing block cooperating with the spaces on said bar for securing the block successively in spaced position with respect to the saw for filing corresponding teeth, said block supporting a bow guide beneath it, a bow slidable through said guide, and means for supporting a file carried by said bow, substantially as described and for the purpose set forth.

2. In apparatus of the character described in claim 1, a polygonal bar, a cylindrical sleeve conforming to the shape of the bar slidably positioned thereon, said sleeve being rotatable in a corresponding bore in the spacing block, and means for securing said sleeve in said block.

3. In apparatus of the character described in claim 1, a spacing bar having its spaces uniformly spaced throughout its length except for an end space of one-half the space width of the other spaces.

4. In apparatus of the character described in claim 1, wherein the end supports for the spacing bar are severally provided with two sets of upwardly open seats for the bar, one set being on a different alignment from the other set and providing a temporary support for the bar to hold the file guiding parts out of working relationship with the saw.

5. An improved spacing bar for a saw filing device of the character described wherein the file is guided by means of a spacing block having indexing means for cooperating with the spacing bar and slidable lengthwise with respect to the saw and the saw is reversible with respect thereto, said bar being provided with at least one row of spaced index devices, the devices in said row being spaced at the same distance apart except for the end device which is spaced at one-half said distance from the adjacent device in said row.

BURDETTE W. McCULLEY.

REFERENCES CITED

The following references are of record in the file of this patent:

UNITED STATES PATENTS

| Number | Name | Date |
|---|---|---|
| 268,904 | Jones | Dec. 12, 1882 |
| 409,866 | Penrose | Aug. 27, 1889 |
| 537,827 | Kaempfer | Apr. 23, 1895 |
| 1,165,248 | Hanson | Dec. 21, 1915 |
| 1,223,191 | Merritt | Apr. 17, 1917 |
| 1,562,305 | Decheff | Nov. 17, 1925 |
| 2,019,330 | Altman | Oct. 29, 1935 |
| 2,256,016 | Coghlan | Sept. 16, 1941 |